Jan. 1, 1952  F. W. ROSS  2,580,841
FLAP-AILERON FOR AIRPLANES
Filed Oct. 2, 1946

INVENTOR.
FREDERICK W. ROSS
BY
ATTORNEY

UNITED STATES PATENT OFFICE 2,580,841

FLAP AILERON FOR AIRPLANES

Frederick W. Ross, Detroit, Mich., assignor to Bendix Aviation Corporation, Detroit, Mich., a corporation of Delaware Application October 2, 1946, Serial No. 700,599

1 Claim. (Cl. 244—90)

This invention relates to airplanes and more particularly to aerodynamic surfaces and controls therefor.

Broadly the invention comprehends full span sectionalized drooping ailerons movable differentially or lowered concomitantly at the will of the pilot of the airplane through the medium of conventional control wheel or stick and push-pull rods.

The ailerons are divided spanwise so as to provide inboard sections and outboard sections, and the respective sections are so connected to the push-pull rods that when drooped from neutral position the inboard sections are deflected to a greater degree than the outboard sections so as to give lateral stability and control in or near stalling speeds and at or near stalling angles of attack.

An object of the invention is to provide inboard and outboard auxiliary aerodynamic surfaces which when used as the trailing edges of a wing maintain smooth airflow over the outboard sections of the wings when the inboard sections of the wings are stalled out, to the end that the tips of the wings may not be completely stalled out, and, accordingly, better roll control and lateral stability is obtained in the stall or at partial stall.

Another object of the invention is to provide flap-ailerons for use in conjunction with wings of the stream-lined type characterized in that when stall progresses over the wing as the angle of attack is increased adverse yaw is greatly decreased.

Another object of the invention is to provide full span sectionalized flap-ailerons for use on aerodynamic surfaces characterized in that the flaps may be lowered to a greater extent so that take-off and landing speeds may be reduced and also that drag may be reduced for partial stall condition so that better landing glide and lower sinking speeds may be obtained.

Other objects and advantages of the invention will appear from the following description when considered in connection with the drawings forming a part of this specification, and in which.

Figure 1:
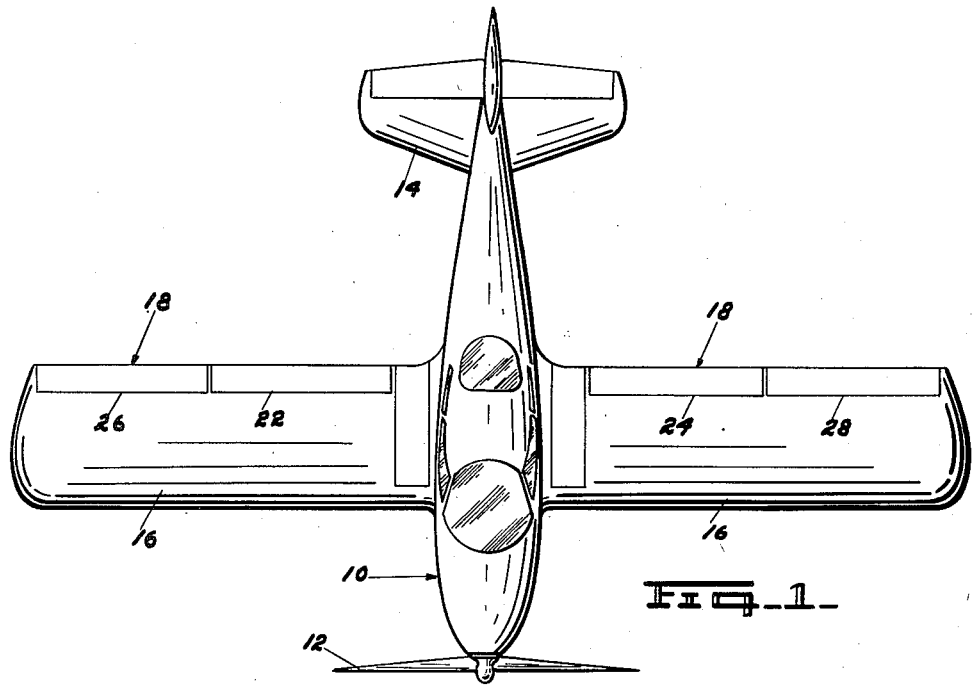
Fig. 1 is a top plan view of an airplane embodying the invention.
Figure 2:
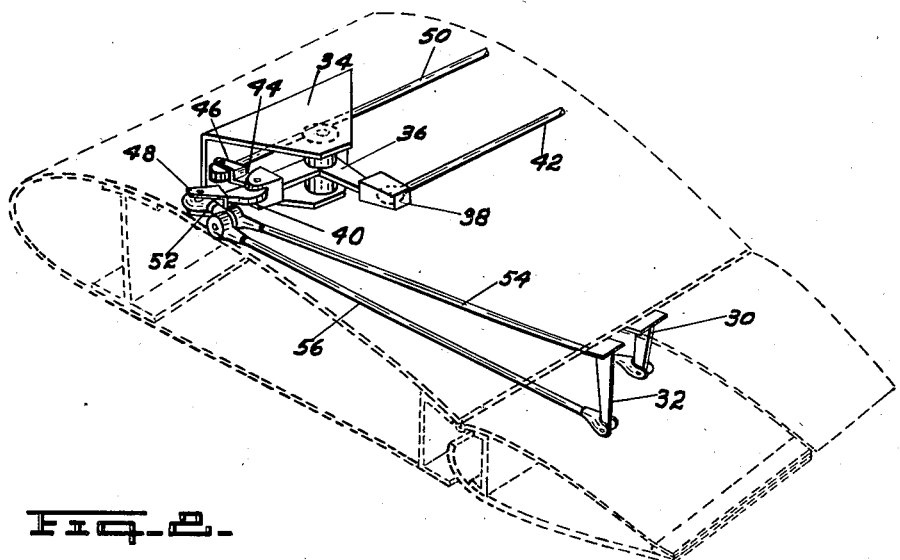
Fig. 2 is an enlarged fragmentary view of one wing of the airplane partly broken away so as to show the controls for the flap-aileron.

Referring to the drawings for more specific details of the invention, 10 represents a fuselage having suitable housing facilities for a pilot and passengers, and also suitable housing facilities for a power plant, not shown, for driving a propeller 12. The fuselage also has thereon conventional empennage 14.

Oppositely disposed wings 16 of like structure are secured to the fuselage, and sectionalized span wise flap-ailerons 18 of exceptionally large area, are pivotally connected to the trailing edges of the wings as by hinges 20. The leading edges of the flaps are so contoured as to render the use of gap covers unnecessary, and the wings support a main landing gear, not shown, preferably of the retractable type.

The flap-ailerons 18 are divided into inboard sections 22 and 24 and outboard sections 26 and 28. The inboard sections have secured thereto near the ends thereof adjacent the outboard sections horns 30, and the outboard sections have secured thereto near the ends thereof adjacent the inboard sections relatively long horns 32.

Brackets 34 suitably secured on the frames of wings support bell crank levers 36 arranged in oppositely disposed relation to one another. The legs of the bell crank levers terminate in clevises 38 and 40. The clevises 38 are connected by pull rods 42 to a control wheel, not shown, and the clevises 40 pivotally support bell crank levers 44 arranged in oppositely disposed relation to one another and the legs of these levers terminate in clevises 46 and 48. The clevises 46 are connected by push-pull rods 50 to a control wheel, not shown, and the clevises 48 are connected to yokes 52, which, in turn, are connected by push-pull rods 54 and 56 to the short horns 30 and to the relatively long horns 32 respectively.

The flap-ailerons of this invention are operative in the following manner, when the pilot is maintaining control of roll in straight and level flight.

Roll corrections are made by the pilot so manipulating the control wheel or stick as to cause aileron push rod 50 to be actuated. Actuation of aileron push rod 50 causes rotation of bell cranks 44 in clevis 40. Rotation of bell cranks 44 results in a translatory motion of push rods 54 and 56. The translatory motion of push rods 54 and 56 is in turn transposed into rotary action as it is passed to the control horns 30 and 32, resulting in an up or downward deflection of the surfaces 24 and 28 actuated by them. Inasmuch as the period of translation of push rods 54 and 56 is of the same order of magnitude, and control horn 30 is physically shorter than control horn 32, the resultant angular rotation of control horn 30 is appreciably greater than the angular rotation of control horn 32.

For a given control movement, inboard flap-aileron section 24 actuated by control horn 30 will exhibit a greater amount of deflection than will outboard flap-aileron section 28 actuated by control horn 32.

The flap-ailerons of this invention are operative in the following manner, when the airplane is being flown during take-off or landing conditions wherein the aerodynamic surfaces of the aircraft are so adjusted as to provide higher than normal lift coefficients.

By suitably manipulating the airplane controls, the droop control push rods 42 may be actuated, thus rotating bell cranks 36.

The rotation of bell cranks 36 so positions clevices 40 and the pivotal points as to bring bell cranks 44 to new positions which causes push rods 54 and 56 to lie in more forward positions, thus pulling control horns 30 and 32 forward and causing the surfaces actuated by them, 24 and 28, to be deflected downward or extended.

The condition and positioning of control parts and surfaces in nowise interferes with the mode of aileron operation hitherto described.

It is then apparent that the pilot may, by suitable manipulation of the aircraft controls, cause actuation of the flap-ailerons to effect roll control, whether the flap-ailerons are in retracted, partially extended, or in full extended positions.

While this invention has been described in connection with certain specific embodiments, the principle involved is susceptible of numerous other applications that will readily occur to persons skilled in the art.

Having thus described the various features of the invention, what I claim as new and desire to secure by Letters Patent is:

In an airplane having a fuselage and aerodynamic surfaces, inboard and outboard auxiliary aerodynamic surfaces pivoted to the trailing edges of the aerodynamic surfaces, a short horn on each of the inboard auxiliary surfaces, a relatively long horn on each of the outboard auxiliary surfaces, a fixed support on each aerodynamic surface, a bell crank lever pivoted on each support, a push-pull rod connected to one leg of each bell crank lever, a second bell crank lever pivotally supported on the other leg of each of the first mentioned bell crank levers, a push-pull rod connected to one leg of each of the second mentioned bell crank levers, a yoke pivoted to the other leg of each of the second mentioned bell crank levers, and push-pull rods connecting the yoke to the short and long horns on the auxiliary surfaces.

FREDERICK W. ROSS.

REFERENCES CITED

The following references are of record in the file of this patent:

UNITED STATES PATENTS

| Number | Name | Date |
|---|---|---|
| 2,218,128 | Wagner | Oct. 15, 1940 |
| 2,346,464 | Tampier | Apr. 11, 1944 |

FOREIGN PATENTS

| Number | Country | Date |
|---|---|---|
| 11,397 | France | Dec. 11, 1909 |
| | (6th addition to 392,672) | |